United States Patent
Kato (10) Patent No.: US 9,641,094 B2
(45) Date of Patent: May 2, 2017

(54) CONVERTER AND POWER CONVERSION DEVICE HAVING AN IMBALANCE DETECTION UNIT

(71) Applicant: Mitsubishi Electric Corporation, Tokyo (JP)

(72) Inventor: Masanori Kato, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/114,464

(22) PCT Filed: Mar. 11, 2015

(86) PCT No.: PCT/JP2015/057192
§ 371 (c)(1),
(2) Date: Jul. 27, 2016

(87) PCT Pub. No.: WO2016/143100
PCT Pub. Date: Sep. 15, 2016

(65) Prior Publication Data
US 2017/0005588 A1    Jan. 5, 2017

(51) Int. Cl.
*H02M 7/06* (2006.01)
*H02M 7/08* (2006.01)
(Continued)

(52) U.S. Cl.
CPC ............ *H02M 7/06* (2013.01); *H02M 1/14* (2013.01); *H02M 5/458* (2013.01); *H02M 7/08* (2013.01);
(Continued)

(58) Field of Classification Search
CPC .......... H02M 7/06; H02M 1/14; H02M 5/458; H02M 7/49; H02M 7/17; H02M 2001/0009
See application file for complete search history.

(56) References Cited

U.S. PATENT DOCUMENTS 3,585,484 A    6/1971  Dortort
5,963,440 A *  10/1999 Gibbs .................. H02H 7/1206
                                                  363/129
(Continued)

FOREIGN PATENT DOCUMENTS

JP          56-6675 A      1/1981
JP        5-300744 A     11/1993
(Continued)

OTHER PUBLICATIONS

Written Opinion of PCT/JP2015/057192 dated May 19, 2015.
International Search Report of PCT/JP2015/057192 dated May 19, 2015.

*Primary Examiner* — Timothy J Doyle
*Assistant Examiner* — Yusef Ahmed
(74) *Attorney, Agent, or Firm* — Sughrue Mion, PLLC; Richard C. Turner (57) ABSTRACT

A converter includes a converter circuit that converts the AC voltages supplied from the Δ-connection and the Y-connection, which are two systems of a 12-phase rectifier transformer, to a DC voltage; a current detector that detects the current in a DC bus output from the converter circuit; and an imbalance detection unit that detects the occurrence of an imbalance between the current output from the Δ-connection and the current output from the Y-connection, the currents being detected by the current detector. The converter can detect an imbalance that occurs between the current flowing in the diode bridge on the Δ-connection side and the current flowing in the diode bridge on the Y-connection side.

3 Claims, 5 Drawing Sheets (51) Int. Cl.
  *H02M 1/14* (2006.01)
  *H02M 5/458* (2006.01)
  *H02M 1/00* (2006.01)
  *H02P 27/06* (2006.01)

(52) U.S. Cl.
  CPC ..... *H02M 2001/0009* (2013.01); *H02P 27/06* (2013.01)

(56) References Cited

U.S. PATENT DOCUMENTS

| | | | | |
|---|---|---|---|---|
| 5,963,441 | A * | 10/1999 | Gibbs | H02M 7/17 363/128 |
| 5,969,966 | A * | 10/1999 | Sawa | H02M 5/271 363/10 |
| 6,137,700 | A | 10/2000 | Iida et al. | |
| 8,437,155 | B2 * | 5/2013 | Ha | H02M 1/4216 363/37 |
| 2004/0257029 | A1 * | 12/2004 | Sakamoto | G01R 31/343 318/802 |
| 2012/0069612 | A1 * | 3/2012 | Hasler | H02J 3/1842 363/71 |
| 2013/0051105 | A1 * | 2/2013 | Wang | H02M 7/5387 363/132 |
| 2014/0043870 | A1 * | 2/2014 | Swamy | H02M 1/12 363/36 |
| 2014/0103887 | A1 * | 4/2014 | Akagi | H02J 3/1857 323/207 |
| 2015/0280594 | A1 * | 10/2015 | Lin | H02M 3/33546 363/21.04 |
| 2016/0114814 | A1 * | 4/2016 | Donnelly | B61C 3/00 290/3 |
| 2016/0285373 | A1 * | 9/2016 | Lin | H02J 3/36 |
| 2016/0336874 | A1 * | 11/2016 | Kikuchi | H02M 7/483 |

FOREIGN PATENT DOCUMENTS

| | | |
|---|---|---|
| JP | 10-174442 A | 6/1998 |
| JP | 2000-333361 A | 11/2000 |
| JP | 2001-224178 A | 8/2001 |
| JP | 2002-153073 A | 5/2002 |
| JP | 2007-252087 A | 9/2007 |
| JP | 2008-295155 A | 12/2008 |

* cited by examiner

ETC/JP2015/057192...

CONVERTER AND POWER CONVERSION DEVICE HAVING AN IMBALANCE DETECTION UNIT

CROSS REFERENCE TO RELATED APPLICATIONS

This application is a National Stage of International Application No. PCT/JP2015/057192 filed Mar. 11, 2015, the contents of which are incorporated herein by reference in their entirety.

FIELD

The present invention relates to a converter that converts an alternating-current (AC) voltage to a direct-current (DC) voltage and a power conversion device.

BACKGROUND

Some power conversion devices are configured from a 12-phase rectifier transformer in order to prevent harmonics from leaking to the AC system. In 12-phase rectifier transformers, there are configurations where the primary side is configured as a Y-connection and the secondary side is configured as a Δ-connection and a Y-connection, and there are configurations where the primary side is configured as a Δ-connection and the secondary side is configured as a Δ-connection and a Y-connection. A 12-phase rectifier transformer performs 12-phase rectification by generating a three-phase alternating current having a phase difference of 30 degrees on the secondary side so that full-wave rectification can be performed (see Patent Literature 1).

CITATION LIST

Patent Literature

Patent Literature 1: Japanese Patent Application Laid-open No. 2008-295155

SUMMARY

Technical Problem

On the secondary side of a 12-phase rectifier transformer, if a difference between the AC voltage output from the Δ-connection and the AC voltage output from the Y-connection causes an imbalance between the current flowing in the diode bridge on the Δ-connection side and the current flowing in the diode bridge on the Y-connection side, the current concentrates in one of the two diode bridges. If this state continues for a long period of time, the diode bridge in which the current concentrates can be damaged by the heat.

The present invention has been achieved in view of the above problems, and an objective of the present invention is to provide a converter and a power conversion device that can detect an imbalance that occurs between the current flowing in the diode bridge on the Δ-connection side and the current flowing in the diode bridge on the Y-connection side.

Solution to Problem

In order to solve the problem and achieve the objective mentioned above, the present invention relates to a converter that includes: a converter circuit that converts an AC voltage supplied from a Δ-connection and a Y-connection, which are two systems of a 12-phase rectifier transformer, to a DC voltage; a current detector that detects a current in a DC bus output from the converter circuit; and an imbalance detection unit that detects occurrence of imbalance between a current output from the Δ-connection and detected by the current detector and a current output from the Y-connection and detected by the current detector.

Advantageous Effects of Invention

A converter in accordance with the present invention can detect an imbalance between the current flowing in the diode bridge on the Δ-connection side and the current flowing in the diode bridge on the Y-connection side.

DESCRIPTION OF EMBODIMENTS

Exemplary embodiments of a converter and a power conversion device in accordance with the present invention will be explained below in detail with reference to the accompanying drawings. Note that the present invention is not limited to the embodiments.

First Embodiment

Figure 1:
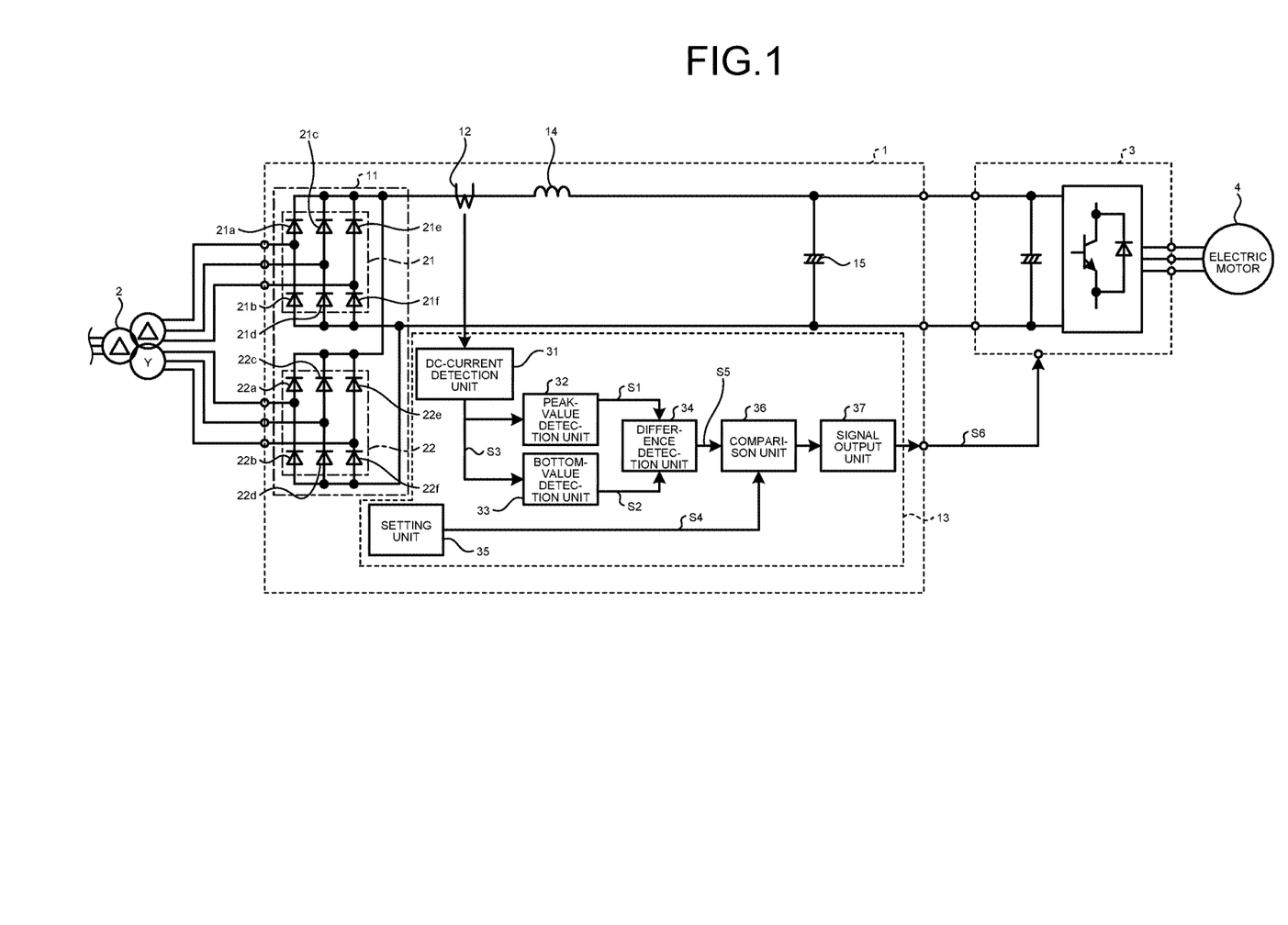
FIG. 1 is a configuration diagram of a converter according to a first embodiment.
Figure 2:
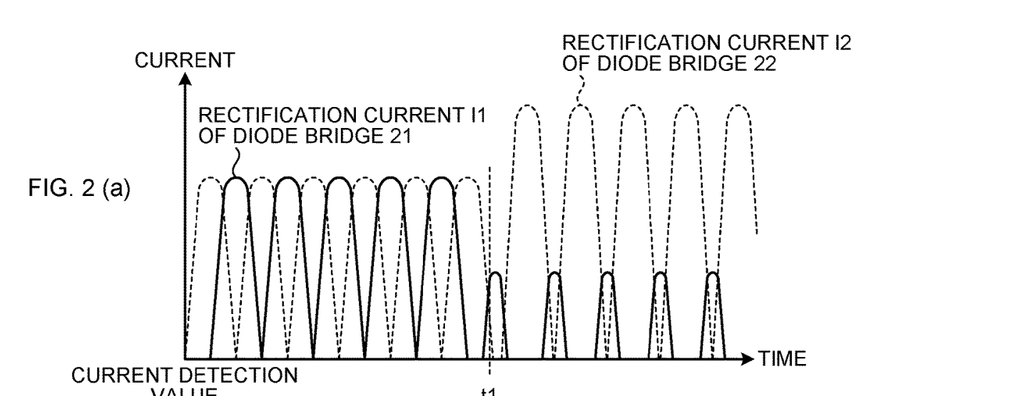
FIG. 2(a), FIG. 2(b) and FIG. 2(c) are explanatory diagrams of an operation of the converter according to the first embodiment.
Figure 3:
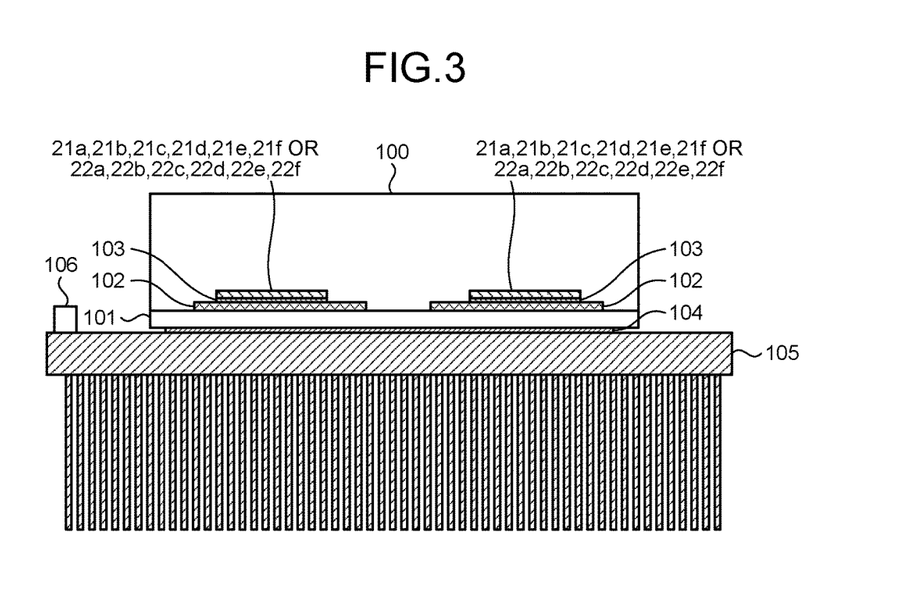
FIG. 3 is a sectional view of a diode module according to the first embodiment.

FIG. 1 is a diagram illustrating a configuration of a converter 1 according to a first embodiment. FIG. 2(a), FIG. 2(B) and FIG. 2(c) are explanatory diagrams of an operation of the converter 1 according to the first embodiment. FIG. 3 is a sectional view of a diode module 100 according to the first embodiment.

The converter 1 converts AC voltages supplied from a 12-phase rectifier transformer 2 to a DC voltage and supplies this DC voltage to an inverter 3. The inverter 3 converts the DC voltage to AC voltages and supplies the AC voltages to an electric motor 4. In the first embodiment, the primary side of the 12-phase rectifier transformer 2 is configured as a Δ-connection; however, the primary side can be configured as a Y-connection.

The converter 1 includes a converter circuit 11 that converts an AC voltage to a DC voltage; a current detector 12 that detects the current on a DC bus; an imbalance detection unit 13 that detects current imbalance, a DC reactor 14 that reduces a ripple component; and a smoothing capacitor 15 that smoothes the voltage.

The converter circuit 11 converts an AC voltage to a DC voltage. The AC voltage supplied from the Δ-connection and the Y-connection, which are the two systems of the 12-phase rectifier transformer 2. The converter circuit 11 includes a diode bridge 21, which performs full-wave rectification on the output voltage of the Δ-connection, and a diode bridge 22, which performs full-wave rectification on the output voltage of the Y-connection. The diode bridge 21 includes six diode elements 21a, 21b, 21c, 21d, 21e, and 21f. The diode bridge 22 includes six diode elements 22a, 22b, 22c, 22d, 22e, and 22f. In the following descriptions, the diode elements 21a, 21b, 21c, 21d, 21e, and 21f, and the diode elements 22a, 22b, 22c, 22d, 22e, and 22f are collectively referred to as a "diode element group".

The current detector 12 detects the current on the DC bus output by the converter circuit 11 and outputs a detected detection value to the imbalance detection unit 13. In the first embodiment, the current detector 12 is provided at a stage before the DC reactor 14. However, the current detector 12 can be provided at a stage after the DC reactor 14. Further, the primary side of the 12-phase rectifier transformer 2 is configured as a Δ-connection, but it can also be configured as a Y-connection.

The imbalance detection unit 13 detects that a current imbalance has occurred between a current output from the Δ-connection and a current output from the Y-connection detected by the current detector 12. A detailed configuration of the imbalance detection unit 13 is described later.

The DC reactor 14 smoothes the DC current rectified by the converter circuit 11 to reduce a ripple component.

The smoothing capacitor 15 smoothes the DC voltage by removing the ripple component of the DC voltage output by the converter circuit 11.

A specific configuration of the imbalance detection unit 13 is described here. The imbalance detection unit 13 includes a DC-current detection unit 31 that detects a DC current S3; a peak-value detection unit 32 that detects a peak value; a bottom-value detection unit 33 that detects a bottom value; a difference detection unit 34 that detects a difference S5 between the peak value and the bottom value; a setting unit 35 that sets a threshold S4; a comparison unit 36 that compares the output of the difference detection unit 34 with the output of the setting unit 35; and a signal output unit 37 that outputs an alarm signal S6.

The DC-current detection unit 31 detects the DC current S3 on the basis of the detection value detected by the current detector 12.

The peak-value detection unit 32 detects the peak value of the DC current S3 detected by the DC-current detection unit 31. The peak-value detection unit 32 generates a peak hold signal S1 on the basis of the detected peak value.

The bottom-value detection unit 33 detects the bottom value of the DC current S3 detected by the DC-current detection unit 31. The bottom-value detection unit 33 generates a bottom hold signal S2 on the basis of the detected bottom value.

The difference detection unit 34 detects the difference S5 between the peak value and the bottom value on the basis of the peak hold signal S1 and the bottom hold signal S2.

The setting unit 35 sets the threshold S4 for the difference between the peak value and the bottom value of the DC current and outputs the threshold S4 to the comparison unit 36.

The comparison unit 36 compares the threshold S4 set by the setting unit 35 with the difference S5 detected by the difference detection unit 34.

As a result of the comparison made by the comparison unit 36, if the difference S5 detected by the difference detection unit 34 exceeds the threshold S4 set by the setting unit 35, the signal output unit 37 outputs an alarm signal S6 to the inverter 3. The inverter 3 stops the operation of the electric motor 4 on the basis of the input of the alarm signal S6.

A case is described here where a difference is generated, at a time t1, between an AC voltage output from the Δ-connection and an AC voltage output from the Y-connection, which constitute the secondary side of the 12-phase rectifier transformer 2, and an imbalance occurs between the current flowing in the diode bridge 21 and the current flowing in the diode bridge 22. It is assumed to be a case where the current concentrates on the diode bridge 21.

At the time t1, if an imbalance occurs between the current flowing in the diode bridge 21 and the current flowing in the diode bridge 22, as illustrated in FIG. 2(a), a current I1 flowing in the diode bridge 21 decreases and a current I2 flowing in the diode bridge 22 increases when compared with a case where these currents are balanced. As illustrated in FIG. 2(b), the imbalance is because a ripple component in the DC current S3 output from the DC-current detection unit 31 increases with an increase in a ripple component in the current on the DC bus output from the converter circuit 11.

If an imbalance occurs between the current flowing in the diode bridge 21 and the current flowing in the diode bridge 22, because the peak hold signal S1 output from the peak-value detection unit 32 increases and the bottom hold signal S2 output from the bottom-value detection unit 33 decreases, the difference S5 between the peak hold signal S1 and the bottom hold signal S2 increases, as illustrated in FIG. 2(b).

The comparison unit 36 compares the threshold S4 set by the setting unit 35 with the difference S5 detected by the difference detection unit 34 and outputs the comparison result to the signal output unit 37. In the first embodiment, as illustrated in FIG. 2(b), it is assumed to be a case where the difference S5 exceeds the threshold S4 at a time t2.

When the signal output unit 37 detects that the difference S5 has exceeded the threshold S4 on the basis of the comparison result of the comparison unit 36, the signal output unit 37 outputs the alarm signal S6 to the inverter 3, as illustrated in FIG. 2(c).

The inverter 3 stops the operation of the electric motor 4 on the basis of the alarm signal S6. By the inverter 3 stopping the operation of the electric motor 4, the current applied to the diode bridge 21 and the diode bridge 22 of the converter 1 becomes zero.

Consequently, if an imbalance occurs between the current flowing in the diode bridge 21 on the Δ-connection side and the current flowing in the diode bridge 22 on the Y-connection side, the converter 1 can detect the current imbalance by using the imbalance detection unit 13 in a short period of time. If a current imbalance is detected by the imbalance detection unit 13, the converter 1 outputs the alarm signal S6 to the inverter 3 so as to stop the operation of the electric motor 4. Consequently, a concentration of the current occurring in one of the diode bridges for a long period of time can be avoided, and damage due to the heat to the diode bridge where the current is concentrated can be prevented.

The diode module 100, constituted by the diode bridge 21 and the diode bridge 22, is described here. FIG. 3 is a sectional view of the diode module 100. In the diode module 100, copper wiring 102, formed on a substrate 101, and the diode element group are fixed to each other by solder 103. The diode module 100 is fixed to a cooling fin 105 by heat radiating grease 104. A temperature sensor 106 that detects the ambient temperature is attached to the cooling fin 105.

It is possible to design a configuration in which, when the temperature detected by the temperature sensor 106 exceeds a set value, the converter 1 determines that abnormal heat is being generated in the diode bridge 21 or the diode bridge 22 and thus detects that there is a current imbalance.

However, with such a configuration, in a case where the diode bridge 21 and the diode bridge 22 are integrally formed in the diode module 100, even if heat generation occurs in one of the diode bridges, the temperature becomes an average temperature due to heat interference or the heat is transferred to the cooling fin 105, which has a large heat capacity. Therefore, the converter 1 cannot detect or takes too long to detect the heat generation.

Consequently, the converter 1 according to the first embodiment, in order to stop the operation of the electric motor 4, detects a current imbalance in a short period of time without being affected by the heat interference between the diode bridge 21 and the diode bridge 22 nor being affected by the heat capacity of the cooling fin 105. Consequently, the converter 1 can prevent damage to the diode bridge due to heat.

It is known that the repeated temperature rises exceeding an upper limit and the repeated temperature drops exceeding a lower limit cause fatigue breakdown of the diode element group. Because the converter 1 according to the first embodiment stops the operation of the electric motor 4 by detecting a current imbalance in a short period of time, fatigue breakdown of the diode element group can be prevented by suppressing temperature rises that do not exceed the upper limit.

Second Embodiment

Figure 4:
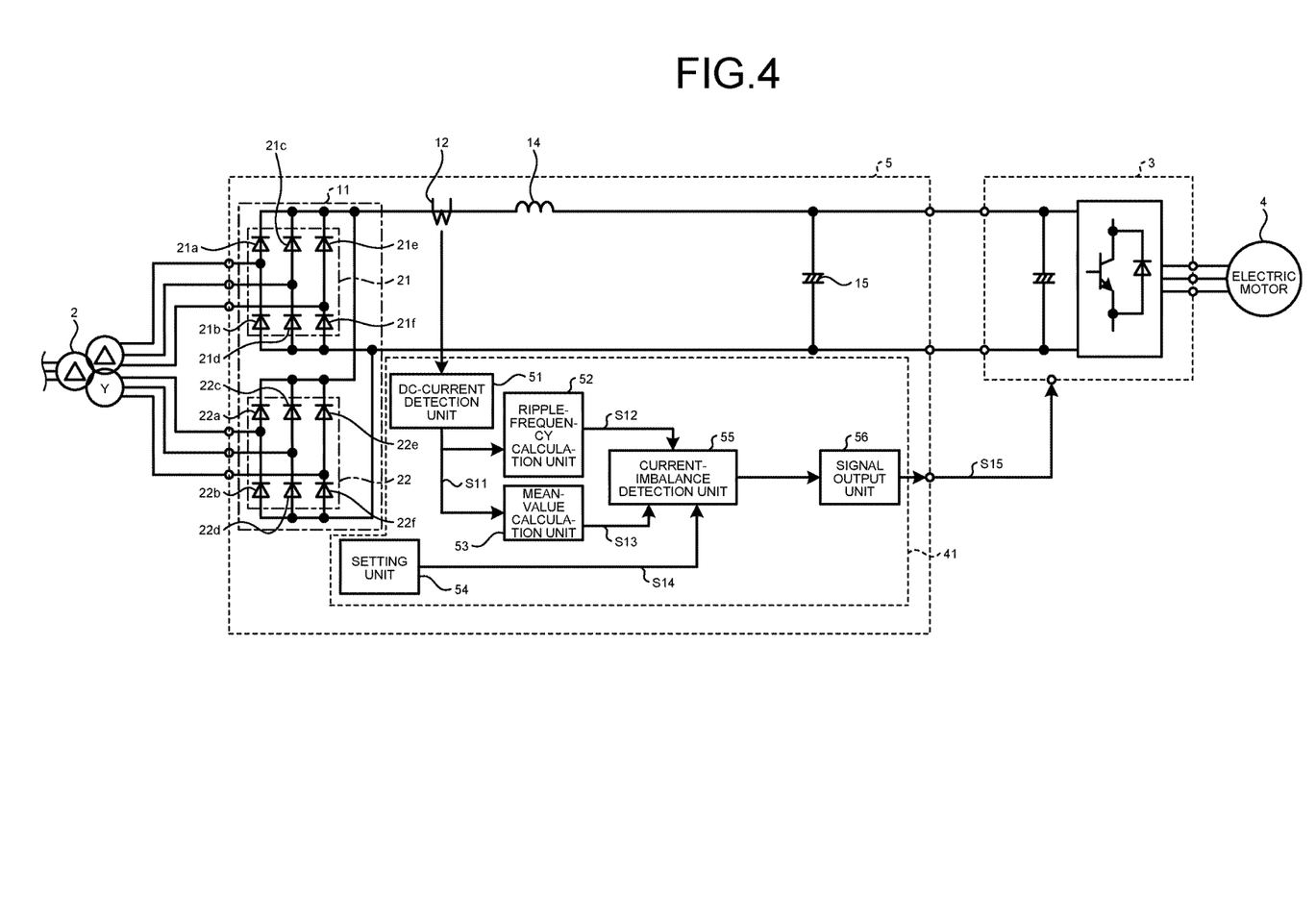
FIG. 4 is a configuration diagram of a converter according to a second embodiment.

FIG. 4 is a diagram illustrating a configuration of a converter 5 according to a second embodiment. FIG. 5(a), FIG. 5(b), FIG. 5(c) and FIG. 5(d) are explanatory diagrams of an operation of the converter according to the second embodiment. The converter 5 converts an AC voltage supplied from the 12-phase rectifier transformer 2 to a DC voltage and supplies this DC voltage to the inverter 3. The inverter 3 converts the DC voltage to an AC voltage and supplies this AC voltage to the electric motor 4. In the second embodiment, the primary side of the 12-phase rectifier transformer 2 is configured as a □-connection; however, the primary side can be alternately configured as a Y-connection.

The converter 5 includes the converter circuit 11 that converts an AC voltage to a DC voltage; the current detector 12 that detects a current in the DC bus; an imbalance detection unit 41 that detects a current imbalance; the DC reactor 14 that reduces a ripple component; and the smoothing capacitor 15 that smoothes the voltage.

The converter 5 according to the second embodiment and the converter 1 according to the first embodiment are different from each other with regard to the configurations of the imbalance detection unit 41 and the imbalance detection unit 13. The configurations of the second embodiment are the same as those described in the first embodiment other than with regard to the imbalance detection unit 41. Therefore, like reference signs are used and descriptions thereof will be omitted. The configuration of the imbalance detection unit 41 is described below.

The imbalance detection unit 41 detects that a current imbalance has occurred on the basis of a detection value detected by the current detector 12. The imbalance detection unit 41 includes a DC-current detection unit 51 that detects a DC current S11; a ripple-frequency calculation unit 52 that calculates the ripple frequency S12 of the DC current S11; a mean-value calculation unit 53 that calculates a mean value S13 of the DC current S11; a setting unit 54 that sets a threshold S14; a current-imbalance detection unit 55 that detects the occurrence of a current imbalance; and a signal output unit 56 that outputs an alarm signal S15.

The DC-current detection unit 51 detects the DC current S11 on the basis of a detection value detected by the current detector 12.

The ripple-frequency calculation unit 52 calculates the ripple frequency S12 of the DC current S11 detected by the DC-current detection unit 51. The ripple frequency S12 of the DC current calculated by the ripple-frequency calculation unit 52 is described here. AC voltages are supplied from the 12-phase rectifier transformer 2 to the converter 5. Accordingly, the ripple frequency S12 calculated by the ripple-frequency calculation unit 52 becomes 12 times the value of the power-supply voltage frequency in a balanced state. However, if an imbalance occurs between the current flowing in the diode bridge 21 and the current flowing in the diode bridge 22, the ripple frequency S12 calculated by the ripple-frequency calculation unit 52 decreases to 6 times the value of the power-supply voltage frequency. An error can occur in measuring the ripple frequency depending on the measuring accuracy, but the ripple frequency will be 6 times or 12 times the value of the power-supply voltage frequency.

The mean-value calculation unit 53 calculates the mean value S13 of the DC current S11 detected by the DC-current detection unit 51. The setting unit 54 sets the threshold S14.

If it is detected that the ripple frequency S12 of the DC current calculated by the ripple-frequency calculation unit 52 is not 12 times the power-supply voltage frequency and that the mean value S13 of the DC current calculated by the mean-value calculation unit 53 has exceeded the threshold S14 set by the setting unit 54, the current-imbalance detection unit 55 detects that a current imbalance has occurred on the basis of the detection value detected by the current detector 12.

If the current-imbalance detection unit 55 detects a current imbalance, the signal output unit 56 outputs an alarm signal S15 to the inverter 3. The inverter 3 stops the operation of the electric motor 4 on the basis of the input of the alarm signal S15.

In the case described here, it is assumed that an imbalance occurs between the current flowing in the diode bridge 21 and the current flowing in the diode bridge 22 at the time t1 and then, a large amount of heat generation occurs in the diode bridge 21 or the diode bridge 22 at the time t2.

Figure 5:
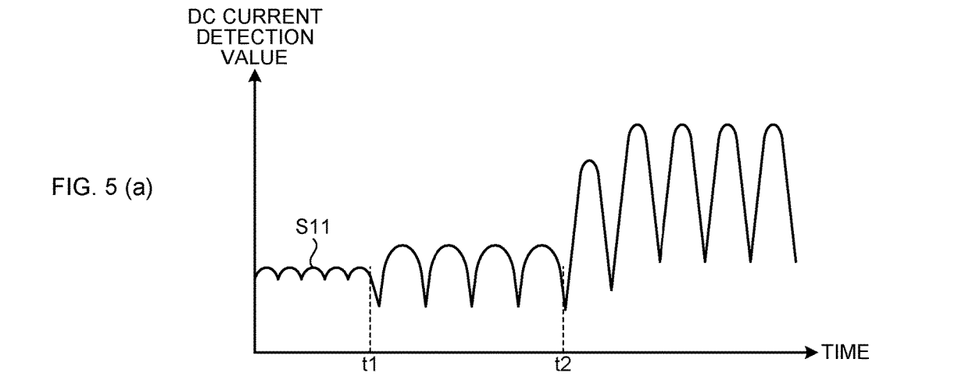
FIG. 5(a), FIG. 5(b), FIG. 5(c) and FIG. 5(d) are explanatory diagrams of an operation of the converter according to the second embodiment.

At the time t1 when the imbalance occurs between the current flowing in the diode bridge 21 and the current flowing in the diode bridge 22, as illustrated in FIG. 5(a) the ripple component of the DC current S11 detected by the DC-current detection unit 51 increases when compared to a case where a current imbalance has not occurred.

If the electric motor 4 has a light load and the shaft output is small, because the current concentrating in one of the diode bridge 21 and the diode bridge 22 is small, it can be assumed that the possibility of damaging the diode element group due to heat is low.

However, if it is assumed that the load on the electric motor 4 is heavy and the shaft output is large, the current rectified in the converter circuit 11 becomes large and the current concentration in one of the diode bridge 21 and the diode bridge 22 also becomes large, thereby increasing the possibility of heat damaging the diode element group.

As illustrated in FIG. 5(b) and FIG. 5(c), if the ripple frequency S12 of the DC current calculated by the ripple-frequency calculation unit 52 is detected as not being 12 times the values of the power-supply voltage frequency, i.e., the ripple frequency S12 is 6 times the value of power-supply voltage frequency, and the mean value S13 of the DC current S11 calculated by the mean-value calculation unit 53 exceeds the threshold S14 set by the setting unit 54, then the current-imbalance detection unit 55 determines that a current imbalance has occurred on the basis of the detection value detected by the current detector 12. In the second embodiment, it is assumed that a current imbalance is detected at a time t3.

When the current-imbalance detection unit 55 detects a current imbalance, as illustrated in FIG. 5(d), the signal output unit 56 outputs an alarm signal S15 to the inverter 3.

The inverter 3 stops the operation of the electric motor 4 on the basis of the alarm signal S15. By the inverter 3 stopping the operation of the electric motor 4, the current applied to the diode bridge 21 and the diode bridge 22 of the converter 5 becomes zero.

Consequently, if an imbalance occurs between the current flowing in the diode bridge 21 on the Δ-connection side and the current flowing in the diode bridge 22 on the Y-connection side, the converter 5 can detect the current imbalance by using the imbalance detection unit 41 in a short period of time. If current imbalance is detected by the imbalance detection unit 41, the converter 5 outputs the alarm signal S15 to the inverter 3 to stop the operation of the electric motor 4. Accordingly, the concentrating of a current in one of the diode bridges for a long period of time can be avoided and the heat damage to the diode bridge in which the current is concentrating can be prevented.

The configuration described in the above embodiments is only an example of the substance of the present invention. The configuration can be combined with other well-known techniques and a part thereof can be modified or omitted without departing from the scope of the invention.

REFERENCE SIGNS LIST 1 converter, 2 12-phase rectifier transformer, inverter, 4 electric motor, 11 converter circuit, 12 current detector, 13, 41 imbalance detection unit, 14 DC reactor, 15 smoothing capacitor, 21, 22 diode bridge, 21a, 21b, 21c, 21d, 21e, 21f, 22a, 22b, 22c, 22d, 22e, 22f diode element, 31, 51 DC-current detection unit, 32 peak-value detection unit, 33 bottom-value detection unit, 34 difference detection unit, 35, 54 setting unit, 36 comparison unit, 37, 56 signal output unit, 52 ripple-frequency calculation unit, 53 mean-value calculation unit, current-imbalance detection unit.

The invention claimed is:

1. A converter comprising:
a converter circuit that converts an AC voltage supplied from a Δ-connection and a Y-connection, which are two systems of a 12-phase rectifier transformer, to a DC voltage;
a current detector that detects a current in a DC bus output from the converter circuit; and
an imbalance detection unit that detects occurrence of imbalance between a current output from the Δ-connection and detected by the current detector and a current output from the Y-connection and detected by the current detector, wherein
the imbalance detection unit includes
a DC-current detection unit that detects a DC current on the basis of a detection value detected by the current detector,
a peak-value detection unit that detects a peak value of the DC current,
a bottom-value detection unit that detects a bottom value of the DC current,
a difference detection unit that detects a difference between the peak value and the bottom value,
a setting unit that sets a threshold for a difference between the peak value and the bottom value of the DC current,
a comparison unit that compares a threshold set by the setting unit with the difference detected by the difference detection unit, and
a signal output unit that outputs an alarm signal when a result of a comparison made by the comparison unit is detected by the difference detection unit as a difference that exceeds the threshold set by the setting unit.

2. A converter comprising:
a converter circuit that converts an AC voltage supplied from a Δ-connection and a Y-connection, which are two systems of a 12-phase rectifier transformer, to a DC voltage;
a current detector that detects a current in a DC bus output from the converter circuit; and
an imbalance detection unit that detects occurrence of imbalance between a current output from the Δ-connection and detected by the current detector and a current output from the Y-connection and detected by the current detector, wherein
the imbalance detection unit includes
a DC-current detection unit that detects a DC current on the basis of a detection value detected by the current detector,
a ripple-frequency calculation unit that calculates a ripple frequency of a DC current detected by the DC-current detection unit,
a mean-value calculation unit that calculates a mean value of a DC current detected by the DC-current detection unit,
a setting unit that sets a threshold,
a current-imbalance detection unit that, when a ripple frequency of a DC current calculated by the ripple-frequency calculation unit is other than 12 times a value of a power-supply voltage frequency and when a mean value of a DC current calculated by the mean-value calculation unit exceeds a threshold set by the setting unit, detects occurrence of current imbalance on the basis of a detection value detected by the current detector, and
a signal output unit that outputs an alarm signal when current imbalance is detected by the current-imbalance detection unit.

3. A power conversion device comprising:
the converter according to claim 1; and
an inverter that receives an alarm signal output from the converter.

* * * * *